(12) United States Patent
Heidasch et al.

(10) Patent No.: US 9,792,355 B2
(45) Date of Patent: Oct. 17, 2017

(54) SEARCHES FOR SIMILAR DOCUMENTS

(75) Inventors: Robert Heidasch, Speyer (DE); Stefan Scheidl, Dieburg (DE); Michael Neumann, Speyer (DE); Stephan Brand, Wiesloch (DE); Nico Licht, Heidelberg (DE); Klaus Reichenberger, Frankfurt (DE); Archim Heimann, Wiesloch (DE); Steffen Moldaner, Riedstadt (DE)

(73) Assignees: intelligent views gmbh, Darmstadt (DE); SAP SE, Walldorf (DE)

( * ) Notice: Subject to any disclaimer, the term of this patent is extended or adjusted under 35 U.S.C. 154(b) by 718 days.

(21) Appl. No.: 13/281,050

(22) Filed: Oct. 25, 2011

(65) Prior Publication Data
US 2013/0103664 A1 Apr. 25, 2013

(51) Int. Cl.
*G06F 7/00* (2006.01)
*G06F 17/30* (2006.01)

(52) U.S. Cl.
CPC .............. *G06F 17/30675* (2013.01)

(58) Field of Classification Search
CPC ................................. G06F 17/30675
USPC ......................................... 707/730
See application file for complete search history.

(56) References Cited

U.S. PATENT DOCUMENTS

| | | | | |
|---|---|---|---|---|
| 2002/0016787 | A1* | 2/2002 | Kanno | G06F 17/3061 |
| 2002/0188604 | A1* | 12/2002 | Tada | G06F 17/30637 |
| 2004/0230572 | A1* | 11/2004 | Omoigui | G06F 17/30528 |
| 2005/0165600 | A1* | 7/2005 | Kasravi | G06F 17/2211 704/9 |
| 2007/0143322 | A1* | 6/2007 | Kothari | G06F 17/2211 |
| 2008/0028300 | A1* | 1/2008 | Krieger | G06Q 10/10 715/255 |
| 2008/0263038 | A1* | 10/2008 | Judge | G06F 17/2775 |

OTHER PUBLICATIONS

Brants, Thorsten, et al., "Finding Similar Documents in Document Collections", Workshop at LREC, [Online]. Retrieved from the Internet: <URL: http://www-ksl.stanford.edu/people/stolle/Papers/brants-lrec.pdf>, (2002), 7 pgs.

* cited by examiner

*Primary Examiner* — Van Oberly
(74) *Attorney, Agent, or Firm* — Schwegman Lundberg & Woessner, P.A.

(57) ABSTRACT

In an embodiment, a method is provided for searching similar documents. Here, a document is accessed and terms from a metamodel semantic network is identified. The document is analyzed to identify a number of the terms from the metamodel semantic network that are also found in the document, and to identify a frequency of occurrence in the document for each term. A search is conducted for other documents having frequencies of occurrences that are similar to the identified frequency of occurrence. These other documents have been previously analyzed using the same terms from the metamodel semantic network.

14 Claims, 10 Drawing Sheets

SEARCHES FOR SIMILAR DOCUMENTS

FIELD

The present disclosure relates generally to data searches. In an embodiment, the disclosure relates to searches for similar documents.

BACKGROUND

As collections of natural language documents become large, tools are need to browse, search, manipulate, analyze, and manage such collections. In particular, searching for similar documents within a collection of documents has an important role in text mining and document management. For example, the capability to search for similar documents plays a key functionality in many business enterprise applications.

Many existing search techniques are based on searching for matching strings in documents to locate similar documents. That is, similar documents can be found based on matching of keywords between the documents. For example, Latent Semantic Indexing (LSI) is an indexing and retrieval method that uses a mathematical technique called Singular value decomposition (SVD) to identify patterns in relationships between texts. Additionally, LSI has the capability to extract the conceptual content of a body of texts by establishing associations between those texts that occur in similar contexts. LSI is based on the principle that words that are used in the same contexts tend to have similar meanings.

However, the methodology used by LSI to extract the conceptual context is notoriously inaccurate because often, the texts themselves do not provide sufficient context information. For example, many technical documents include abbreviations for names and phrases, and the determination of context based on the abbreviations is often inaccurate because of an inherent mismatch between the actual names and abbreviations.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Figure 1:
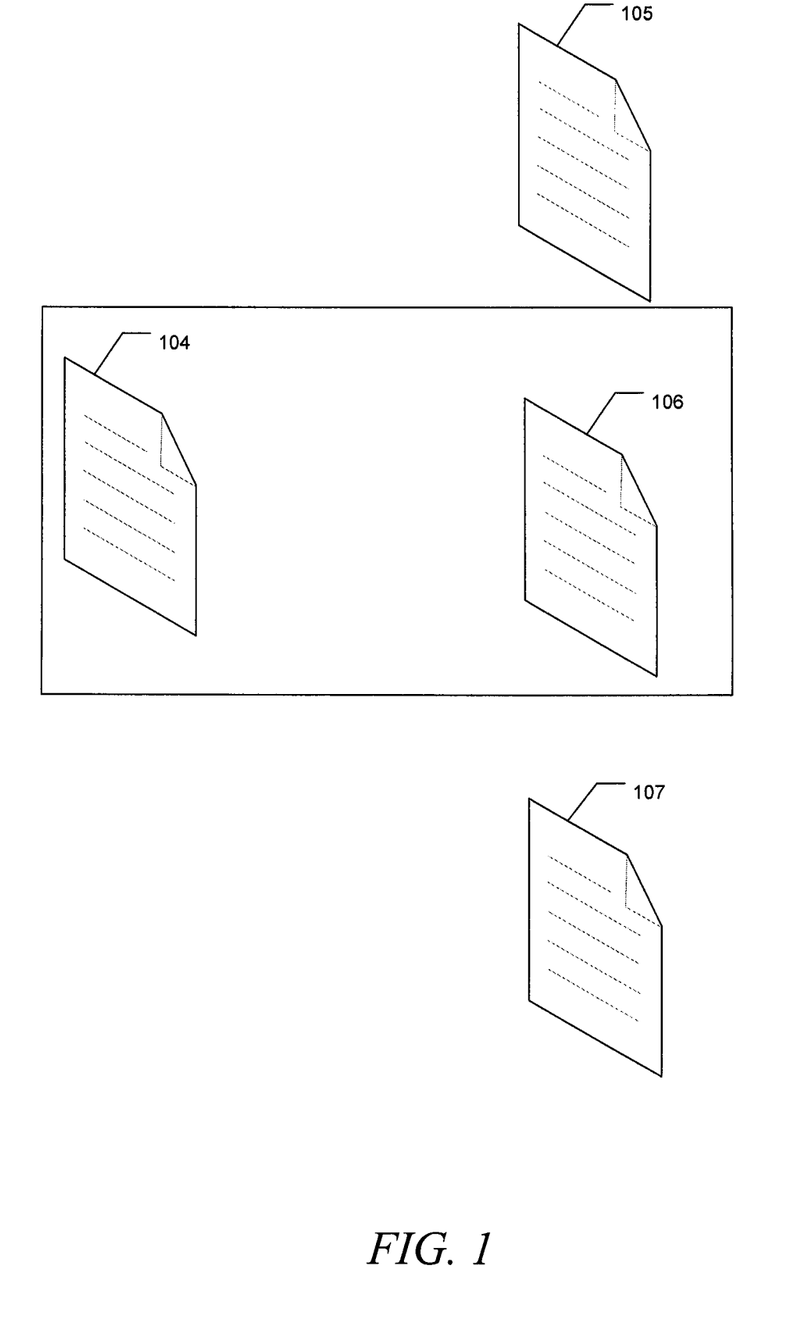
FIG. 1 is a diagram depicting a search for similar documents, in accordance with an example embodiment of the present invention.

FIG. 1 is a diagram depicting a search for similar documents, in accordance with an example embodiment of the present invention. In this example, a collection of documents 104-107 is provided. A "document," as used herein, refers to electronic media content that is accessible by computer technology. For example, each document 104, 105, 106, or 107 can be a file that is not an executable file or a system file and includes data for use by a computer program. Examples of a document 104, 105, 106, or 107 include a single or multiple files that are accessible by and/or associated with electronic document processing applications, such as word processing applications, document viewers, email applications, presentation applications, spreadsheet applications, diagramming applications, Web browsers, and other applications. Therefore, as explained in more detail below, each document 104, 105, 106, or 107 may be composed of alphanumeric texts along with symbols, images, videos, sounds, and/or other data.

Referring to FIG. 1, two or more of these documents 104-107 may be similar to each other. To search for similar documents, each document 104, 105, 106, or 107 is analyzed with respect to terms from a metamodel semantic network, which is a representation of semantic relations among terms. For example, as explained in more detail below, document 104 is generally analyzed using a metamodel semantic network to identify a number of common terms shared between the document 104 and the metamodel semantic network. With these common terms identified, a frequency with which each common term occurs in the document 104 is calculated.

All the other documents 105-107 are also analyzed using the same metamodel semantic network that was used to analyze document 104. The results of the analysis (e.g., frequencies of occurrences of the common terms) can be stored in a searchable index, and from this index, a search can be done to locate similar documents 104, 105, 106, and/or 107. For example, as depicted in FIG. 1, the frequencies of occurrences for common terms found in both documents 104 and 106 are very close or equal to each other. As a result, embodiments of the present invention can identify, using the techniques described below, that document 104 is similar to document 106.

Figure 2:
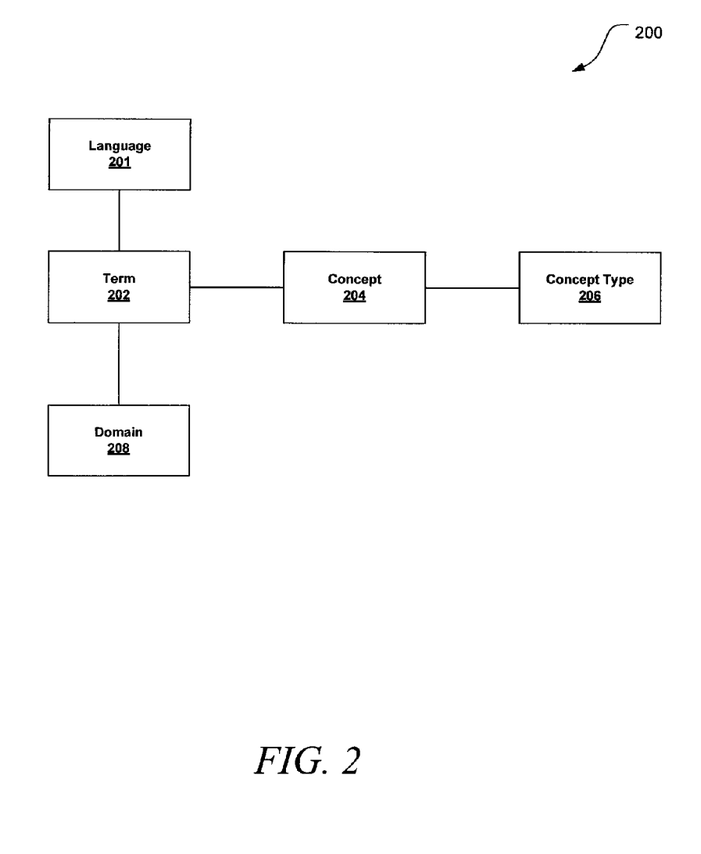
FIG. 2 is a block diagram depicting the building blocks of a metamodel semantic network, in accordance with an example embodiment of the present invention.

FIG. 2 is a block diagram depicting the building blocks of a metamodel semantic network 200, in accordance with an example embodiment of the present invention. In general, a metamodel semantic network 200 is a representation of semantic relations among terms. In the example embodiment depicted in FIG. 2, the metamodel semantic network 200 can include one or more terms 202, languages 201, domains 208, concepts 204, and concept types 206. A concept 204 is general idea or notion that corresponds to a term 202. In one example, the concept 204 can be a synonym of the term 202. For example, a concept of "United States of America" can correspond to a term "America" because "America" is a synonym of "United States of America." A concept type 206 is a description of the concept 204. In the example discussed above, a concept type of "country" can be associated with the concept "United States of America" because the United States of America is a type of country. The metamodel semantic network 200 can also assign a language 201 to a term 202, the language 201 of which describing a language of the term 202 (e.g., English, German, or other languages)

One or more terms 202, including their associated languages 201, concepts 204, and concept types 206, included in a metamodel semantic network 200 can be grouped into a domain 208. As used herein, a domain 208 refers to a common name under which a collection of terms are grouped and organized. Therefore, a domain 208 includes a collection of terms. For example, a particular domain 208 can include the terms "table," "database," and "column." Another example of a domain 208 can include the terms "spreadsheet," "table," "inventory," and "phone number." A user can define the terms 202 to be included in the domain 208.

Figure 3:
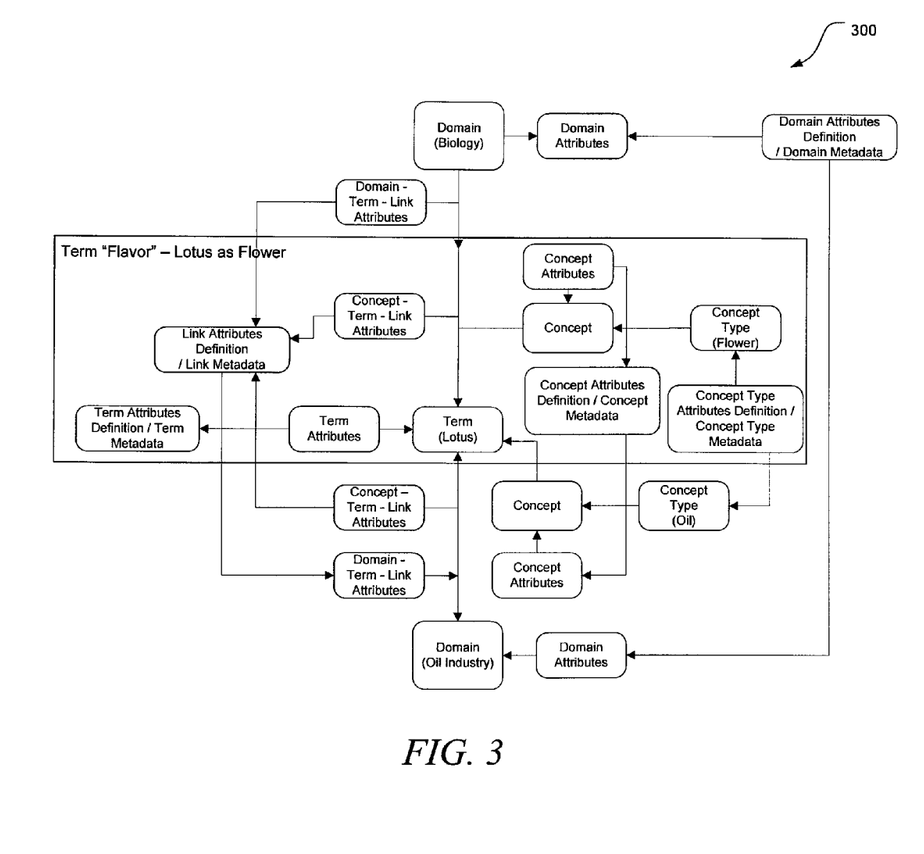
FIG. 3 is a dependency diagram depicting an example of a metamodel semantic network, in accordance with an example embodiment of the present invention.

FIG. 3 is a dependency diagram depicting an example of a metamodel semantic network 300, in accordance with an example embodiment of the present invention. This metamodel semantic network 300 includes the term "Lotus" and its concepts, concept attributes, and domains. In addition, the metamodel semantic network 300 also includes various attributes and metadata associated with the term "Lotus," concepts, concept types, and domains.

As illustrated, the term "Lotus" can be grouped in the "Biology" domain or the "Oil Industry" domain. In the "Biology" domain, the term "Lotus" is associated with a concept described by "Flower" concept type. In contrast, the term "Lotus" is associated with a concept described by an "Oil" concept type. As illustrated in FIG. 3, the highlighted box 304 encompasses and identifies all the terms and concepts and their respective metadata and attributes that are grouped in the "Biology" domain rather than the "Oil Industry" domain.

Figure 4:
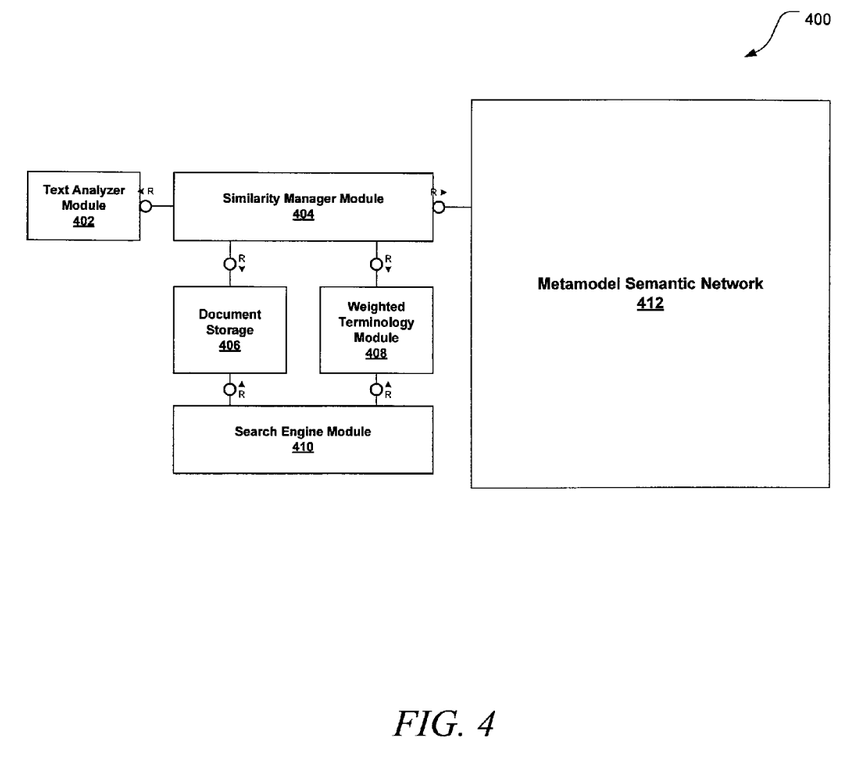
FIG. 4 is a block diagram depicting an architectural overview of a system that is configured to search for similar documents, in accordance with an example embodiment.

FIG. 4 is a block diagram depicting an architectural overview of a system 400 that is configured to search for similar documents, in accordance with an example embodiment. The system 400 includes a similarity module 404 that is in communication with a text analyzer module 402, a metamodel semantic network 412, a document storage 406, and a weighted terminology module 408. Additionally, the system 400 includes a search engine module 410 that is in communication with the document storage 406 and the weighted terminology module 408.

In system 400, documents are stored in the document storage 406. The similarity module 404 is configured to access one or more documents from the document storage 406 and identify a set of terms from the metamodel semantic network 412 for use in analyzing the accessed document. As explained in detail below, there are a variety of different techniques to identify the appropriate set of terms for use in the analysis.

The text analyzer module 402 analyzes the accessed document using this identified set of terms to identify a number of common terms found in both the document and the identified set of terms. Additionally, the text analyzer module 402 is configured to identify a frequency with which each common term occurs in the document and can, in one embodiment, store the identified frequencies in a searchable index.

The search engine module 410 then searches through this index to identify similar documents. As explained in more detail below, similar documents can be identified based on a comparison of the frequencies. As also explained in more detail below, the weighted terminology module 408 is configured to apply weights to the frequencies depending on the lengths of the documents.

It should be appreciated that in other embodiments, the system 400 may include fewer or more modules apart from those shown in FIG. 4. For example, in an alternate embodiment, the text analyzer module 402 can be integrated within the similarity manager module 404. The modules 402, 404, 406, 408, and 410 may be in the form of software that is processed by a processor. In another example, as explained in more detail below, the modules 402, 404, 406, 408, and 410 may be in the form of firmware that is processed by application specific integrated circuits (ASIC), which may be integrated into a circuit board. Alternatively, the modules 402, 404, 406, 408, and 410 may be in the form of one or more logic blocks included in a programmable logic device (for example, a field programmable gate array). The described modules 402, 404, 406, 408, and 410 may be adapted, and/or additional structures may be provided, to provide alternative or additional functionalities beyond those specifically discussed in reference to FIG. 4. Examples of such alternative or additional functionalities will be discussed in reference to the flow diagrams discussed below.

Figure 5:
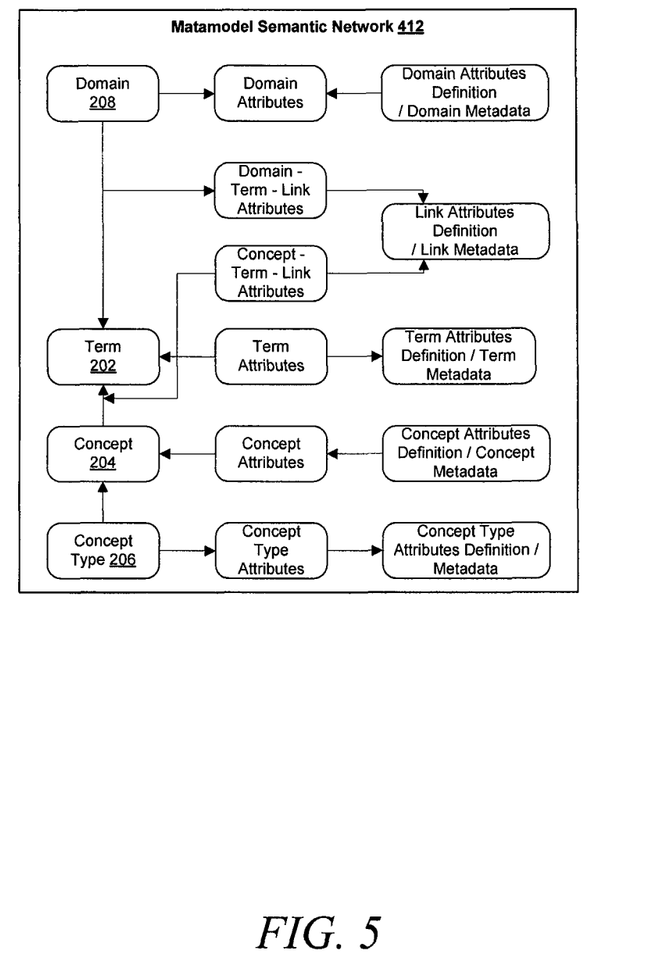
FIG. 5 is a dependency diagram depicting a detailed architecture of a metamodel semantic network, in accordance with an example embodiment.

FIG. 5 is a dependency diagram depicting a detailed architecture of a metamodel semantic network 412, in accordance with an example embodiment. One or more metamodel semantic networks can be modeled after the example of the metamodel semantic network 412 depicted in FIG. 5. Here, the metamodel semantic network 412 comprises domains 208, terms 202, concepts 204, and concept types 206, as described above. Additionally, the metamodel semantic network 412 also includes various attributes and metadata associated with the domains 208, terms 202, concepts 204, and concept types 206. FIG. 5 also illustrates a mapping of the relationships between the domains 208, terms 202, concepts 204, concept types 206, and associated attributes and metadata.

In one embodiment, the metamodel semantic network 412 can be represented as a matrix. For example, the metamodel semantic network 412 can assign a unique identifier to each element (e.g., terms 202 and concepts 204). This unique identifier, for example, can be a value that represents an element's position in the matrix. Alternatively, the unique identifier can be a value generated from applying a hash to the element. Accordingly, each element can be identified by referencing its unique identifier.

Figure 6:
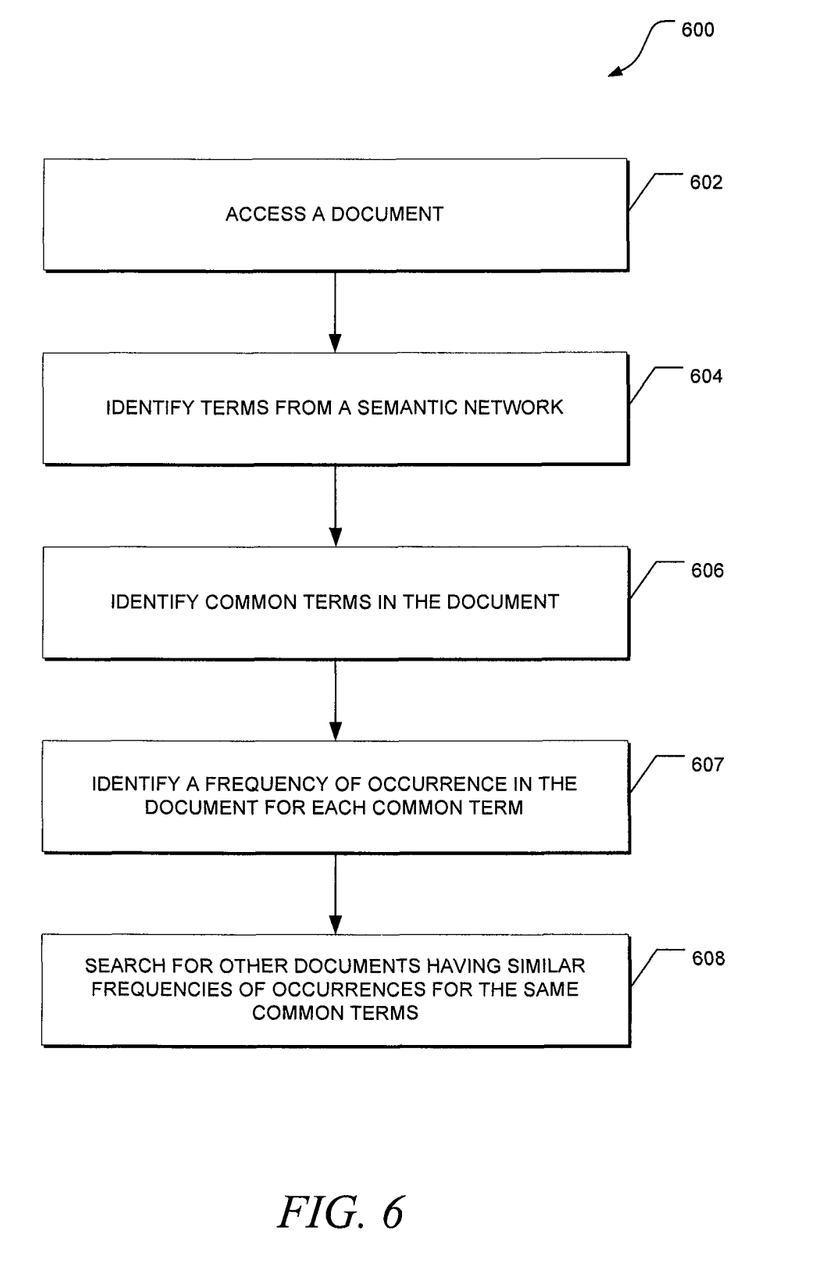
FIG. 6 depicts a flow diagram of a general overview of a method, in accordance with an embodiment, for searching for similar documents.

FIG. 6 depicts a flow diagram of a general overview of a method 600, in accordance with an embodiment, for searching for similar documents. In an example embodiment, the method 600 may be implemented by the system 400 of FIG. 4. Referring to FIG. 6, the similarity manager module accesses a document for analysis at 602. The similarity manager module, at 604, also identifies a set of terms from the metamodel semantic network. It should be noted that the similarity manager module can use various information to identify and select an appropriate set of terms from the metamodel semantic network for use in the analysis. In one embodiment, the identification can be based on any data or information from the metamodel semantic network. That is, any data or information (e.g., concepts, concept types, attributes, metadata, and domain) can be used as a filter to extract or identify the set of terms. For example, the similarity manager module can identify and select all terms that are described by a "Flower" concept type. In another example, the similarity manager module can identify and select all terms are in the "English" language. In an alternate embodiment, as explained in more detail below, the semantic manager module can select a particular set of terms based on the context in which the document was created.

Afterwards, a text analyzer module analyzes the document, at 606, to identify a number of the identified set of terms from the metamodel semantic network that are also found in the document. A document includes text, and the text analyzer module basically searches for text that match one or more terms from the identified set of terms. In addition, at 607, the text analyzer module also analyzes the document to identify a frequency of occurrence for each term found in both the document and the identified set of terms (or "common term"). To identify the frequency, the text analyzer module counts a number of occurrences of a common term within the document. It should be appreciated that the text analyzer module can use a variety of conventional text analysis techniques to identify common terms and their frequencies of occurrences.

After having identified the frequencies of all common terms, the semantic manager module may, in one embodiment, store the frequencies in a searchable index, which also stores the frequencies of common terms found in other documents that have been previous analyzed using the same metamodel semantic network. At 608, a search engine module then searches for other documents that have frequencies of occurrences that are similar to the identified frequency of occurrence. In the search, the search engine module can, for example, compare the identified frequencies associated with a document with frequencies associated with other analyzed documents.

A document can be found to be "similar" to another document if the frequencies derived from analyzing both documents using the same set of terms are "similar." In one example, a search engine module can identify a frequency to be "similar" to another frequency when both frequencies are identical. In another example, a search engine module can identify a frequency to be "similar" to another frequency if a difference between the frequencies fall within a certain range. For example, a user may specify that one frequency is similar to a second frequency if a difference between the first and second frequencies falls within a predefined ±1 range. A frequency having a 5 value can therefore be similar to another frequency having a 6 value because the +1 difference falls within the predefined ±1 range. However, a frequency having a 4 value is not similar to another frequency having a 10 value because the +6 difference falls outside of the predefined ±1 range.

In an alternate embodiment, the difference between two or more frequencies can be used to indicate a degree of similarity between the documents. For example, two documents having small differences between their associated frequencies may be more similar than two documents having larger differences between their associated frequencies. In another example, standard deviation can also be used to measure the degree of similarity. A low standard deviation can indicate that the frequency distribution is very close to the mean and therefore, the documents are very similar. However, a high standard deviation can indicate that the frequencies are spread out over a large range of values and therefore, the documents are not very similar.

The use of a metamodel semantic network to supplement the analysis of the document may improve the accuracy of document searches when compared to conventional search techniques. In particular, the metamodel semantic network effectively provides a separate, independent information on the context in which the search is based. The context information provided by a metamodel semantic network can be much more accurate than context information extracted from the text of the document itself.

Figure 7:
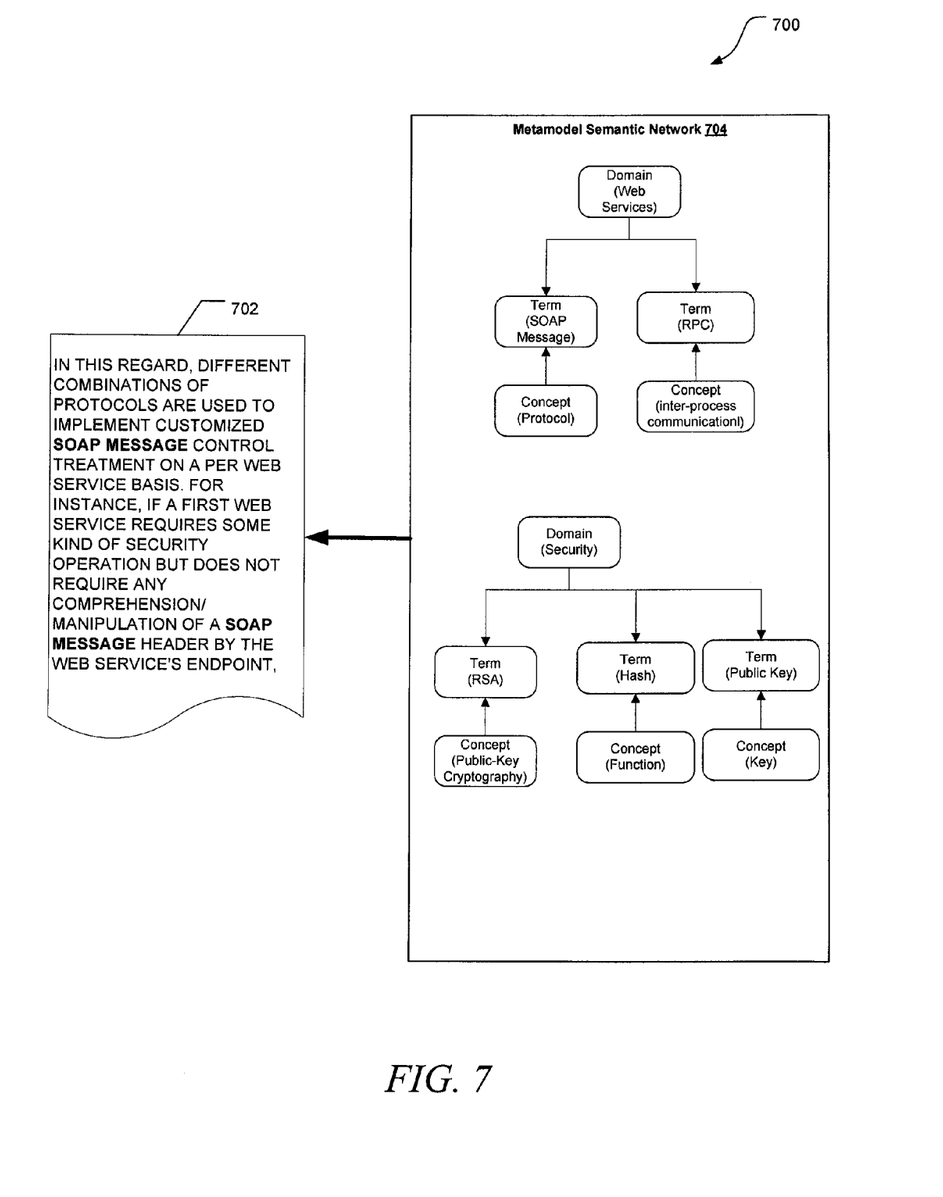
FIG. 7 depicts a diagram illustrating an example analysis of a document, in accordance with an example embodiment of the present invention.

FIG. 7 depicts a diagram illustrating an example analysis of a document 702, in accordance with an example embodiment of the present invention. As depicted, the document 702 is accessed and a metamodel semantic network 704 is provided. The metamodel semantic network 704 includes a "Web Services" domain and a separate "Security" domain. In this example, the set of terms included in the "Security" domain is identified and selected for use in the analysis. As explained in more detail below, the identification of the set of terms (or domain) can be based on the context with which the document 702 was created.

The "Security" domain includes terms "RSA," "Hash," and "Public Key." If this set of terms is selected with the document 702 for analysis, then the text analyzer module will find that the document 702 and the metamodel semantic network 706 do not share any common terms.

However, "Web Services" domain includes different terms "SOAP message" and "RPC." If this alternate set of terms is selected with the document 702 for analysis instead, then the text analyzer module can identify a number of terms from the metamodel semantic network 704 that are also found in the document 702. In this example, the term "RPC" defined in the "Web Services" domain is not found in the document 702. However, the term "SOAP message" defined in the "Web Services" domain is found in the document 702. A further analysis by the text analyzer module reveals that the term "SOAP message" occurs twice within the document 702. The similarity manager module can then store this frequency of occurrence, which equals two, for the term "SOAP message" in a searchable index.

Figure 8A:
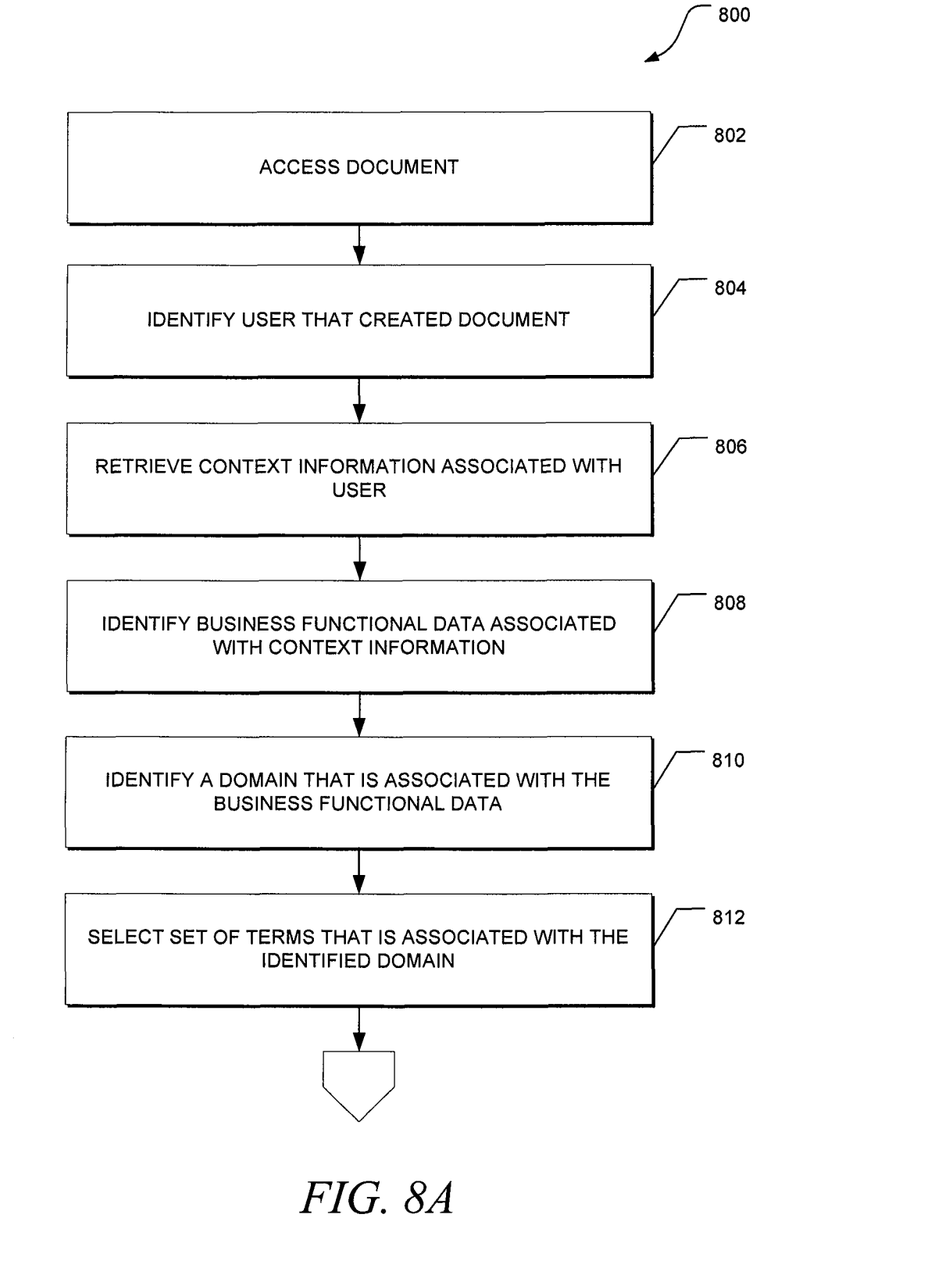
FIGS. 8A and 8B depict a flow diagram of a more detailed overview of a method, in accordance with an alternative embodiment, for searching for similar documents.
Figure 8B:
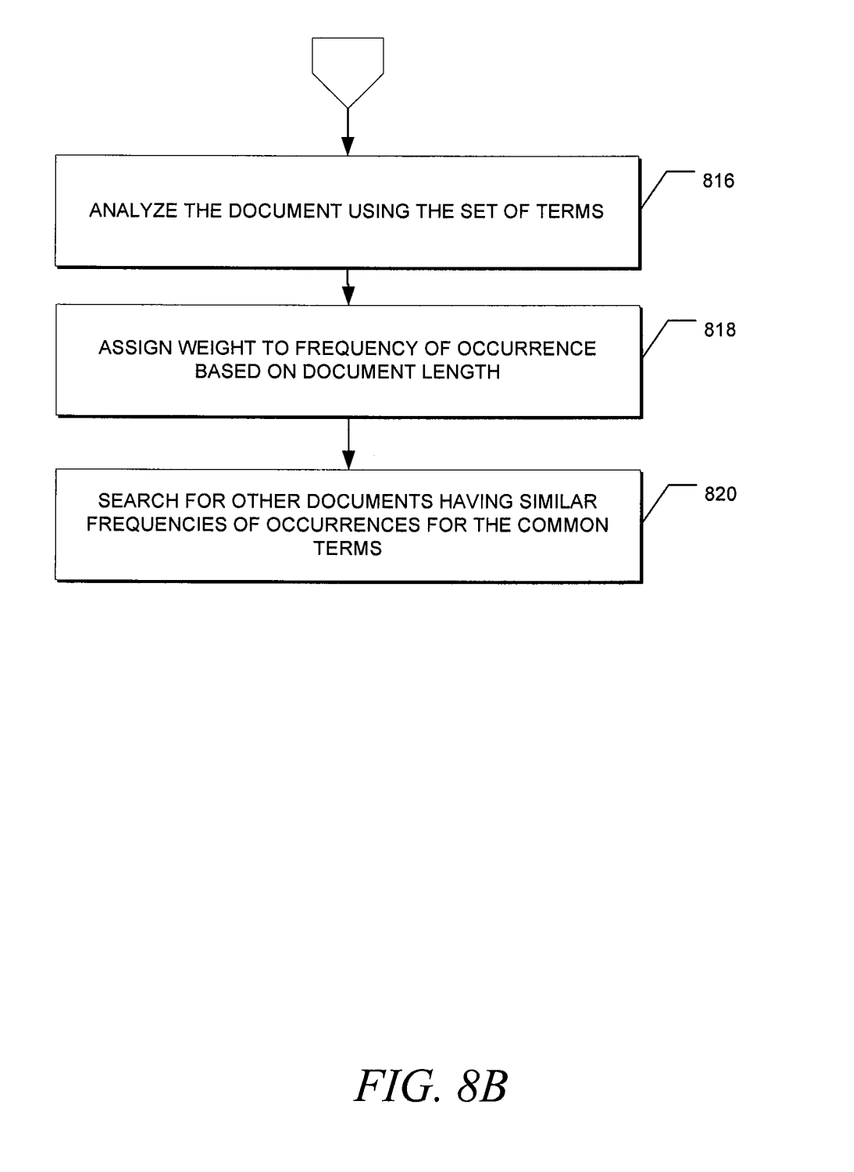

FIGS. 8A and 8B depict a flow diagram of a more detailed overview of a method 800, in accordance with an alternative embodiment, for searching for similar documents. In an example embodiment, the method 800 may be implemented by the system 400 of FIG. 4. Referring to FIG. 8A, the similarity manager module initially, at 802, accesses a document for analysis and, at 804, also identifies a user that created the document. With the user identified, the similarity manager module can retrieve context information associated with the user at 806. Generally, "context information" refers to any information that can be used to characterize the situation of one or more users or computational objects that are considered relevant to the interaction between a user and an application, including the user and the application themselves. Context can include the location, identity, and state of a user or a group of users, such as a user's position within an organization, a user's expertise, a user's competence level, a user's business role, a user's name, a user's business address, and a user's project assignments. Additionally, context can include the location, identity, and state of one or more computational objects, such as a name of a business object and a type of business object. It should be noted that a "business object," as used herein, refers to a representation of a business entity, such as an employee or a sales order, in an enterprise system. That is, a business object is a type of entity inside the business layer in an n-layered architecture of object-oriented computer programs. A business object encompasses both the functions (in the form of methods) and the data (in the form of attributes) of this business entity.

The similarity manager module then, at 808, identifies business functional data that are associated with the context information. As used herein, "business functional data" refer to business objects, business processes, business data storages, and/or transactions. A business process is a series of steps or actions directed to a business functionality. Business data storage refers to the storage of organized collection of business data. For example, business data storage can refer to a variety of different data structures, such as databases, tables, arrays, and linked lists. A transaction specifies the characteristics and attributes of a business transaction.

With the business functional data identified, the similarity manager module, at 810, identifies a domain that is associated with the business functional data. It should be noted that a user, for example, can define the relationships between domains and business functional data. For example, a user can assign a particular domain to a particular business object. In another example, a user can assign a particular domain to a particular business process.

The metamodel semantic network module thereafter, at 812, identifies and selects a set of terms, from a metamodel semantic network, that is associated with the identified domain. Referring now to FIG. 8B, a text analyzer module, at 816, analyzes the document to identify a number of the identified set of terms that are also found in the document. Additionally, the text analyzer module analyzes the document to identify a frequency of occurrence in the document for each common term. In one embodiment, the similarity manager module uses the components and relationships defined in a metamodel semantic network to build a terminology package to transmit to the text analyzer for analysis. For example, the terminology package can be a list of entities in a name catalog. The metamodel semantic network module can create one terminology package for each domain and can keep the definition of the terminology package in a local cache. If the domain is grouped as a hierarchy, the terminology packages can also be stored in the similarity manager module such that the similarity manager module can combine the terminology packages into one or more domains according to the hierarchy. Upon receipt of the terminology packages, the text analyzer analyzes the terminology package to produce an ordered list of, for example, terms, concept types, frequencies of occurrences, and other information.

In an alternate embodiment, the weighted terminology module, at 818, can assign a weight to each frequency of occurrence of a common term based on the document length. It should be appreciated that the frequencies of occurrence can vary depending on a length of a document. Typically, a term occurs more frequently in a long document when compared to a short document. Therefore, a weight may be assigned to each frequency based on the length of each document to possibly improve the accuracy of the search. As used herein, a "weight" refers to a measure of the relative importance of an item (e.g., frequency) in a statistical population. A high weight can be assigned to a frequency of a term in a short document while a low weight can be assigned to a frequency of the same term in a long document.

As discussed above, in one embodiment, a metamodel semantic network can be represented as a matrix, and each term in the matrix can be referenced by a unique identifier. Here, the similarity manager module can take the results of the analysis from the text analyzer module and integrate the results with the unique identifiers and assigned weights to produce a "weighted terminology indicator" for each document. An example of a weighted terminology indicator includes at least the: (1) domain identifier; (2) term unique identifier; (3) and frequency. The similarity manager module can calculate a combined weighted terminology indicator for all terms in a domain. If the domains are organized in a hierarchy, the respective hierarchical dependencies are used to calculate parent-domain related weighted terminology indicators. The similarity manager module can, in one embodiment, store the weighted terminology indicators in a searchable index. In an alternate embodiment, the similarity manager module can store the weighted terminology indicators with the document itself. Within the index, the weighted terminology indicators can be assigned to different users, user groups, or business roles.

At 820, a search engine module then searches for other documents that have frequencies of occurrences that are similar to the identified frequency of occurrence. In one embodiment, the search engine module can, for example, compare the weighted terminology indicators associated with a document with the weighted terminology indicators associated with other previously analyzed documents. In one embodiment, the search may be performed on the domain level (e.g., particular domain and parent-dependent domains). In an alternate embodiment, the search may be performed on a term level, where a user or business application can define a set of terms, and the search engine can search the weighted terminology indicators associated with the set of terms.

Figure 9:
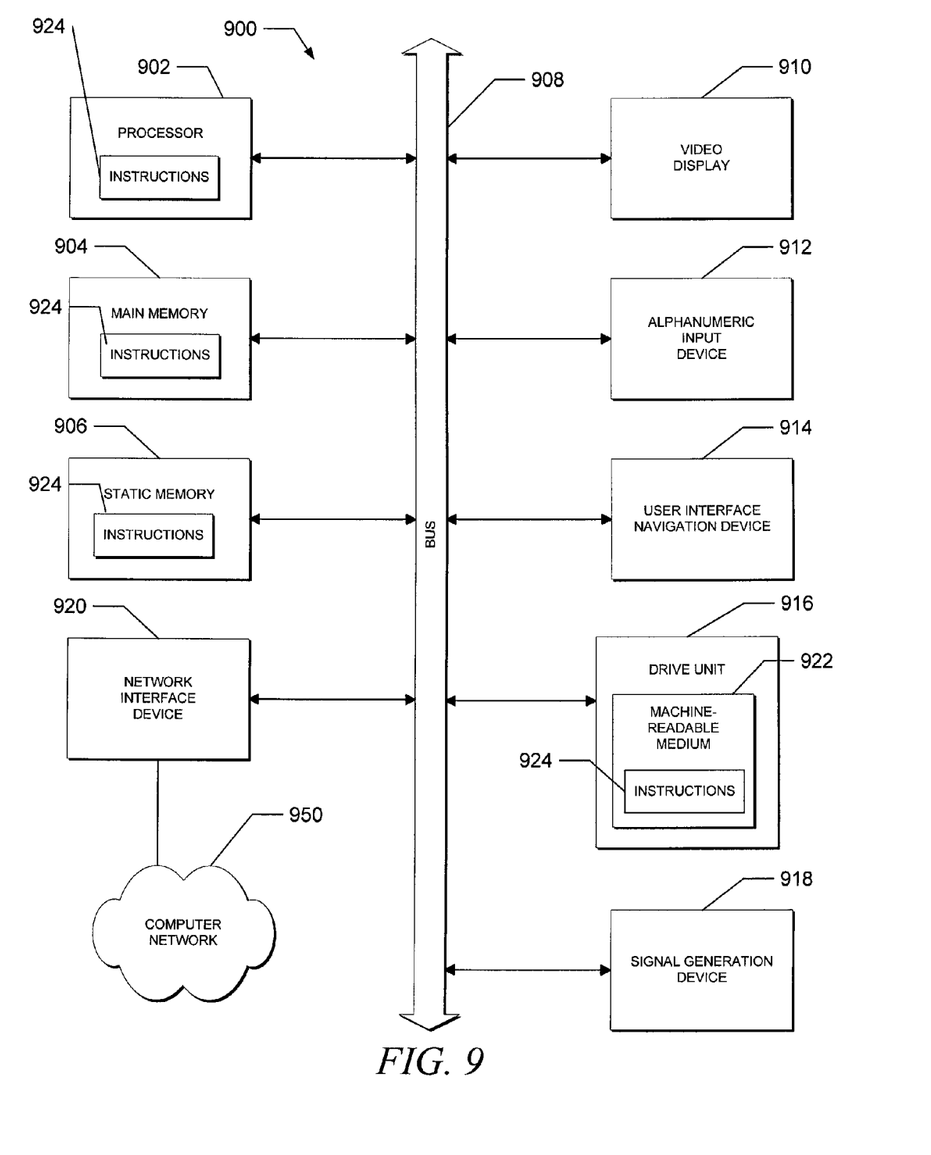
FIG. 9 depicts a block diagram of a machine in the example form of a computing device within which may be executed a set of instructions for causing the machine to perform any one or more of the methodologies discussed herein.

FIG. 9 depicts a block diagram of a machine in the example form of a computing device 900 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 900 includes a processor 902 (e.g., a central processing unit (CPU), a graphics processing unit (GPU) or both), a main memory 904 (e.g., random access memory), and static memory 906 (e.g., static random-access memory), which communicate with each other via bus 908. The computing device 900 may further include video display unit 910 (e.g., a plasma display, a liquid crystal display (LCD) or a cathode ray tube (CRT)). The computing device 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by computing device 900, with the main memory 904 and processor 902 also constituting machine-readable, tangible media.

The data structures and instructions 924 may further be transmitted or received over a computer network 950 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 900) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 902 configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connects the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processors 902 may be located in a single location (e.g., within a home environment, an office environment or as a server farm), while in other embodiments the processors 902 may be distributed across a number of locations.

While the embodiment(s) is (are) described with reference to various implementations and exploitations, it will be understood that these embodiments are illustrative and that the scope of the embodiment(s) is not limited to them. In general, techniques searching documents may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of searching for similar documents, the method comprising:
   accessing a first document;
   identifying one or more terms from a metamodel semantic network;
   identifying one or more terms from the metamodel semantic network that are also found in the first document, wherein the identification of the one or more terms from the metamodel semantic network comprises:
   identifying a user that created the first document;
   retrieving context information associated with the user;
   identifying business functional data associated with the context information;

identifying, from a number of domains, the domain associated with the business functional data, each domain from the number of domains including a different grouping of terms; and selecting terms that are associated with the identified domain for the analysis;

identifying a weighted frequency of occurrence in the first document for each of the one or more identified terms, each weighted frequency of occurrence being a count of occurrences of the corresponding term in the first document multiplied by a weight based on a length of the first document; and searching for another document having one or more weighted frequencies of occurrences that are within a predefined range of a corresponding weighted frequency of occurrence of the corresponding term in the first document, the other document having been previously analyzed using terms from the metamodel semantic network.

2. The method of claim 1, wherein the business functional data is a business object.

3. The method of claim 1, wherein the business functional data is a business process.

4. The method of claim 1, wherein the searching of the other document comprises comparing each of the identified weighted frequencies of occurrences with the corresponding weighted frequency of occurrence.

5. The method of claim 1, wherein a difference between the identified weighted frequency of occurrence and the corresponding weighted frequency of occurrence indicates a degree of similarity.

6. The method of claim 1, wherein the weighted frequencies of occurrences are stored in an index, the method further comprising storing the one or more identified weighted frequencies of occurrences in the index, and wherein the search for the other document is from the index.

7. The method of claim 1, wherein the metamodel semantic network includes the terms and associated concepts.

8. A non-transitory, machine-readable medium that stores instructions, which, when performed by a machine, cause the machine to perform operations comprising:

accessing a first document;

identifying one or more terms from a metamodel semantic network;

identifying one or more terms from the metamodel semantic network that are also found in the first document, wherein the identification of the one or more terms from the metamodel semantic network comprises:

identifying a user that created the first document;
retrieving context information associated with the user;
identifying business functional data associated with the context information;
identifying, from a number of domains, the domain associated with the business functional data, each domain from the number of domains including a different grouping of terms; and
selecting terms that are associated with the identified domain for the analysis;

identifying a weighted frequency of occurrence in the first document for each of the one or more identified terms, each weighted frequency of occurrence being a count of occurrences of the corresponding term in the first document multiplied by a weight based on a length of the first document; and searching for another document having one or more weighted frequencies of occurrences that are within a predefined range of a corresponding weighted frequency of occurrence of the corresponding term in the first document, the other document having been previously analyzed using terms from the identified metamodel semantic network.

9. The non-transitory, machine-readable medium of claim 8, wherein the operation of searching the other document comprises comparing each of the identified weighted frequencies of occurrences with the corresponding weighted frequency of occurrence.

10. The non-transitory, machine-readable medium of claim 8, wherein a difference between the identified weighted frequency of occurrence and the corresponding weighted frequency of occurrence indicates a degree of similarity.

11. The non-transitory, machine-readable medium of claim 8, wherein the weighted frequencies of occurrences are stored in an index, the operations further comprising storing the one or more identified weighted frequencies of occurrences in the index, and wherein the search for the other document is from the index.

12. The non-transitory, machine-readable medium of claim 8, wherein the terms are identified using data in the metadata semantic network as filter.

13. A computing device comprising:
at least one processor; and
a memory in communication with the at least one processor, the memory being configured to store a similarity manager module, a text manager module, and a search engine module that are executable by the at least one processor, the similarity manager module having instructions that when executed by the at least one processor, cause operations to be performed, the operations comprising: accessing a first document; and identifying one or more terms from a metamodel semantic network, the text analyzer module having instructions that when executed by the at least one processor, cause operations to be performed, the operations comprising:

identifying one or more terms from the metamodel semantic network that are also found in the first document, wherein the identification of the one or more terms from the metamodel semantic network comprises:

identifying a user that created the first document;
retrieving context information associated with the user;
identifying business functional data associated with the context information;
identifying, from a number of domains, the domain associated with the business functional data, each domain from the number of domains including a different grouping of terms; and
selecting terms that are associated with the identified domain for the analysis; and
identifying a weighted frequency of occurrence in the first document for each of the one or more identified terms, each weighted frequency of occurrence being a count of occurrences of the corresponding term in the first document multiplied by a weight based on a length of the first document, and the search engine module having instructions that when executed by the at least one processor, cause operations to be performed, the operations comprising searching for another document having one or more weighted frequencies of occurrences that are within a predefined range of a corresponding weighted frequency of occurrence of the corresponding term in the first document, the other document having been previously analyzed using terms from the metamodel semantic network.

14. The computing device of claim 13, wherein the operation of searching for the other document comprises searching for a number of the weighted frequencies of occurrences that fall within a predefined range of the one or more identified weighted frequencies of occurrence.

* * * * *